United States Patent [19]

Herndon

[11] 4,448,375
[45] May 15, 1984

[54] FOLDING TRUSS MECHANISM FOR TRAILING EDGE FLAPS

[75] Inventor: Gerald F. Herndon, Bellevue, Wash.
[73] Assignee: The Boeing Company, Seattle, Wash.
[21] Appl. No.: 463,455
[22] PCT Filed: Sep. 29, 1982
[86] PCT No.: PCT/US82/01356
   § 371 Date: Sep. 29, 1982
   § 102(e) Date: Sep. 29, 1982
[87] PCT Pub. No.: WO84/01343
   PCT Pub. Date: Mar. 29, 1984
[51] Int. Cl.³ .............................................. B64C 9/16
[52] U.S. Cl. ..................................... 244/216; 244/215
[58] Field of Search ............... 244/211, 212, 213, 215, 244/216, 219

[56] References Cited

U.S. PATENT DOCUMENTS

| | | | |
|---|---|---|---|
| 2,158,676 | 5/1939 | Engelhardt | 244/42 |
| 2,222,435 | 11/1940 | Ksoll | 244/42 |
| 2,289,704 | 7/1942 | Grant | 244/42 |
| 2,352,074 | 6/1944 | Brown et al. | 244/42 |
| 2,373,365 | 4/1945 | Westberg | 244/42 |
| 2,445,833 | 7/1948 | Kraemer et al. | 244/42 |
| 2,479,619 | 8/1949 | Hilton et al. | 244/42 |
| 2,501,726 | 3/1950 | Knox | 244/42 |
| 2,516,406 | 7/1950 | Moyer | 244/42 |
| 2,563,453 | 8/1951 | Briend | 244/42 |
| 3,013,748 | 12/1961 | West | 244/216 |
| 3,853,289 | 12/1974 | Nevermann et al. | 244/42 |
| 3,985,319 | 10/1976 | Dean et al. | 244/42 |
| 4,049,219 | 9/1977 | Dean et al. | 244/217 |
| 4,172,575 | 10/1979 | Cole | 244/215 |
| 4,248,395 | 2/1981 | Cole | 244/216 |

FOREIGN PATENT DOCUMENTS

2079688  1/1982  United Kingdom ............... 244/216

Primary Examiner—Charles E. Frankfort
Attorney, Agent, or Firm—Delbert J. Barnard; Eugene O. Heberer

[57] ABSTRACT

A swinging drive link (10) is pivotally connected at its lower end (18) to a forward support (16) for a flap (20). The flap rear support is provided by a pivotal connection (24) between a rear support point and the lower end of a swing link (22). The upper end of the swing link (22) is pivotally connected (31) to the upper end of a support link (26) and the rear end of a slave link (30). The lower end of the support link (26) is attached (27) to a beam structure (28) projecting rearwardly from the main wing section (13, 29). The forward end of the slave link (30) is pivotally attached (40) to an intermediate portion of the drive link (10). Rearward rotation of drive link (10) causes the flap (20) to translate rearwardly with a small amount of downward rotation until the flap (20) is essentially completely extended. Then, further extension of the mechanism rotates the flap (20) a substantial amount downwardly. In a double slot embodiment (FIGS. 7–9), similar linkage is provided between a forward main flap (66) and an aft flap (64).

30 Claims, 10 Drawing Figures (TAKE-OFF POSITION)

Fig. 1
(STOWED POSITION)

Fig. 2
(TAKE-OFF POSITION)

Fig. 3
(LANDING POSITION)

FOLDING TRUSS MECHANISM FOR TRAILING EDGE FLAPS

DESCRIPTION

1. Technical Field

My invention relates to a mechanism for supporting and driving a wing flap. More particularly, it relates to a folding truss type flap support/drive mechanism which is adapted to produce a flap movement closely approaching a rectangular Fowler motion verses deflection angle progression.

2. Background Art

Many different types of mechanisms for supporting, guiding and driving a trailing edge wing flap have been developed for a variety of aircraft. They include (1) a simple hinge, (2) a four-bar upright linkage, (3) a four-bar overhead linkage, (4) variable curvature tracks, (5) circular arc tracks and (6) a folding beam four-bar linkage.

There are one or more obvious deficiencies associated with several of the previously mentioned mechanisms. The simple hinge has a low take-off Fowler motion and requires large fairings with high cruise drag. The four-bar upright linkage has deficiencies similar to the simple hinge but to a lesser degree. The four-bar overhead linkage has high actuation forces. The variable curvature tracks have wear problems with roller carriage. The circular arc tracks have low take-off Fowler motion.

My folding truss mechanism was developed in an effort to minimize the cruise drag associated with flap mechanisms fairings, and at the same time achieve the desirable characteristics of the more effective flap systems now available (e.g. the system used on the Boeing 767 aircraft).

DISCLOSURE OF THE INVENTION

The trailing edge flaps of a high performance aircraft must fulfill two functions. They must provide a high lift to drag ratio take-off configuration and a high lift coefficient landing configuration. A high lift drag ratio for take-off can be accomplished by trailing edge flap positions with high Fowler motion (aft motion, which increases wing projected area), a single converging slot between flap and spoiler trailing edge, and a small flap deflection angle. The high lift coefficient for landing requires high Fowler motion, two relatively narrow converging slots (for double slotted flap) and high flap deflection angles. Theoretically, the best Fowler verses deflection angle progression would be rectangular. This would require two separate mechanisms, one to drive the flap straight aft and another to rotate it. This is not a practical solution. Therefore, a single flap mechanism, that approaches the rectangular progression the closest, is the most desirable.

My folding truss flap support mechanism is a compound four-bar linkage scheme. It is simple in concept and for a single-slotted flap configuration contains the same number of links and joints as the flap mechanism for the Boeing 767 aircraft. All joints are simple pin joints or monoballs, which provide positive structural rigidity and precise positioning control for the mechanism, compared with systems such as curved track roller carriage flap mechanisms. All the links in the support mechanism but one have uni-axial loads, which mean lower structural weight than for mechanisms with links subjected to bending loads.

In basic makeup, my folding truss flap support mechanism comprises a drive link which is pivotally attached at its upper end to an upper frame portion of a wing section forward of the flap, e.g. the main wing body, for fore and aft pivotal movement about a first axis. A second pivot axis is established below and aft of the first pivot axis, by a pivotal connection between the lower end of a support link and a fixed frame portion of the wing structure. The upper end of the support link is pivotally attached to both the upper end of a swing link and the after end of a slave link, to form a third pivot axis. A fourth pivot axis is formed at a forward connection of the flap to the lower end of the drive link. A fifth pivot axis is formed where the lower end of the swing link makes a rearward connection to the flap. The drive link, the portion of the flap which extends between the fourth and fifth axis, the swing link, and wing structure form a first four-bar linkage. The support link, the drive link, the wing section structure which interconnects the first and second pivot axis and the slave link form a second four-bar linkage. This linkage provides a moving anchor point for the swing link. The moving anchor point permits the swing link to be relatively short and to move the rear connection to the flap a greater distance aft, through a shallow arc, for maximum Fowler motion. The shallow arc is necessary for flap transition control to take-off position. The compound motion of the support link/swing link combination, not only provides the desired shallow arc for the flap carriage rear support, but it also creates an abrupt hook motion near the end of the travel to provide ideal flap position for landing.

My folding truss mechanism can be adapted to a variety of flap configurations. These include a single-slotted flap, a double slotted flap (main/aft) and a double slotted flap (vane/main). The support can be provided by an underneath flap support mechanism or by a varied end support flap mechanism.

My folding truss mechanism can be located underneath the flap in a very compact envelope, and requires an enclosure fairing smaller than that of a track flap (Boeing 757 flap, for example). Or, it can be located at the ends of the individual flap panels and contained within the contour of the wing trailing edge, requiring no flap mechanism fairings.

The flap actuation hinge moments and power requirements are low for my folding truss mechanism and the air loads on the flap always tend to move it in a stowing direction, which is a desirable failsafe characteristic for the flap in the event of actuation failure.

BEST MODE FOR CARRYING OUT THE INVENTION

Figures 9, 10:
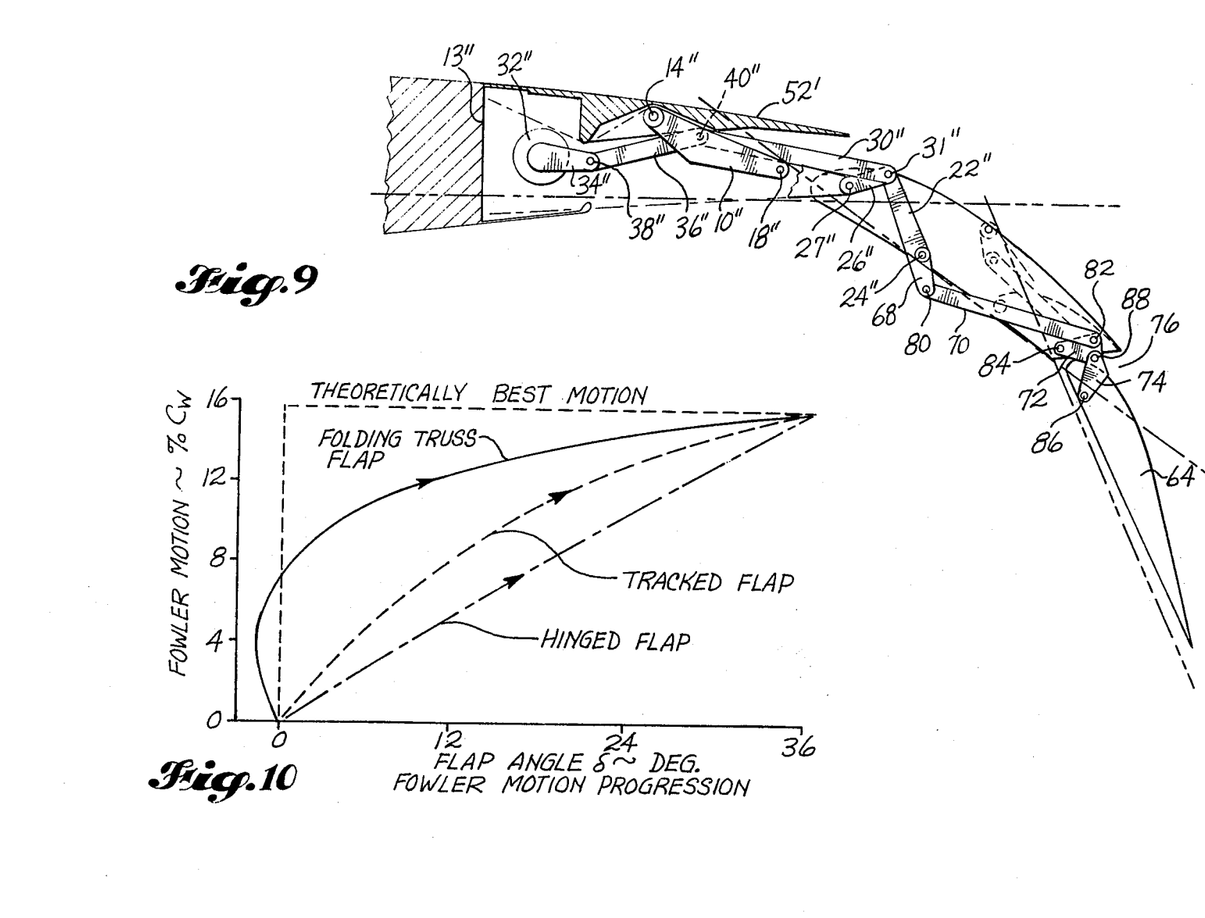
FIG. 9 is a view like FIGS. 1-8, of the mechanism shown by FIGS. 7 and 8, in a landing configuration.
FIG. 10 is a graph of Fowler motion verses flap angle, comparing the Fowler verse deflection angle progression of the folding truss mechanism of the present invention with a tracked flap, a hinged flap, and the theoretically best motion.

As previously mentioned, the best Fowler verses deflection angle progression would be rectangular. This is shown in FIG. 10. FIG. 10 also shows that the folding truss flap support mechanism of the present invention accomplishes this task better than many presently used flap mechanisms.

The versatility of the folding truss flap mechanism of the present invention is evident from the number of flap configurations which can be achieved.

Figure 1:
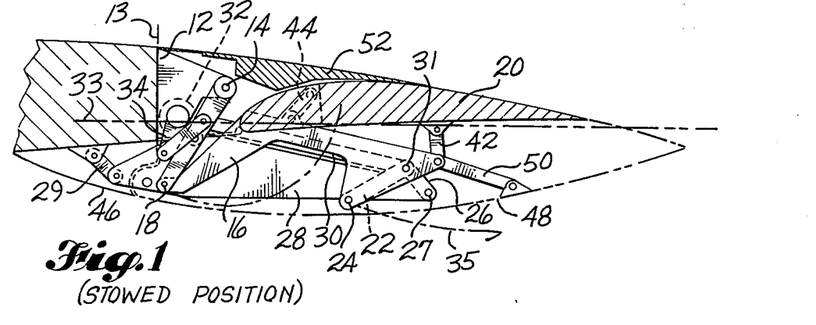
FIG. 1 is a sectional view of a wing showing a single slotted flap and my folding truss mechanism in a stowed position.
Figure 2:
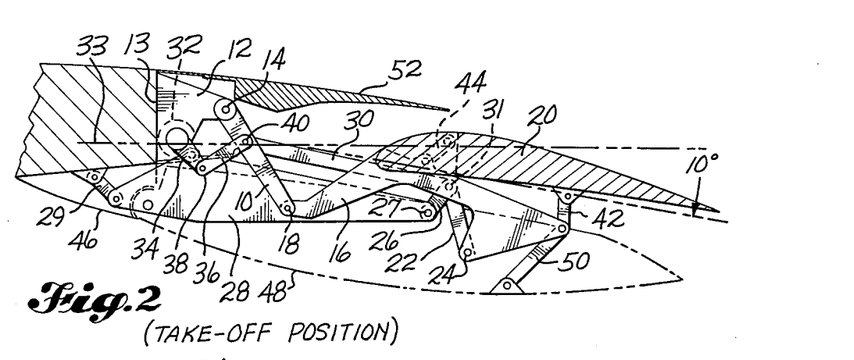
FIG. 2 is a view like FIG. 1, but showing the flap and the truss mechanism in a take-off configuration.
Figure 3:
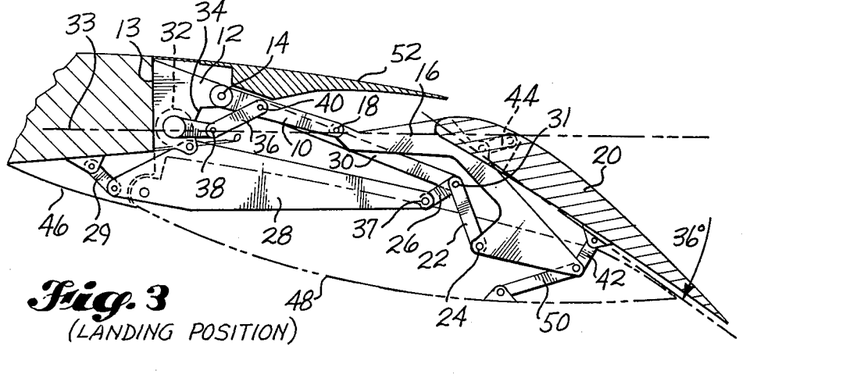
FIG. 3 is a view like FIGS. 1 and 2, but showing the flap and the truss mechanism in a landing configuration.

FIGS. 1-3 show an embodiment of the folding truss mechanism of the present invention as a part of a single-slotted flap, with underneath support.

The basic mechanism comprises two four-bar linkages coupled together in a manner which produces a compound motion of the flap rear support point.

The first or primary four-bar linkage, herein the "overhead" linkage, comprises a drive link 10 which is pivotally attached to fixed structure 12 (it is grounded) for pivotal movement about a pivotal axis 14. Fixed structure 12 may be a bracket on the wing rear spar 13. At its opposite the drive link 10 is pivotally attached to a forward end of a flap carriage link 16, for pivotal movement about a pivot axis 18. Flap carriage link 16 is connected to and supports the flap 20. The primary linkage also includes a swing link 22 which is pivotally attached at one of its ends to the flap carriage link 16, for pivotal movement about a pivot axis 24. Link 22 is pivotally attached at its opposite end to the second four-bar linkage.

The second four-bar linkage provides a moving anchor point for the swing link 22. It comprises an upright support link 26. Link 26 is attached to the fixed structure (it is grounded) through a support beam 28, a slave link 30 and drive link 10. A short support link 29 connects the forward end of beam 28 to the forward wing section.

The pivotal connection between the upper end of drive link 10 and fixed frame structure 12 is herein referred to as the "first" pivot axis. The "second" pivot axis is formed where the lower end of the support link 26 is connected to the beam 28. The "third" pivot axis is formed where the upper ends of the support link 26 and the swing link 22 are connected to the aft end of the slave link 30. The "fourth" pivot axis is established where the lower end of the drive link 10 is connected to the flap member. A "fifth" pivot axis is established where the lower end of the swing link makes a rear connection to the flap member. A "sixth" pivot axis is established where the forward end of the slave link 30 is attached to the drive link 10. The six pivot axes are the basic axes of the mechanism. The particular order followed in the numbering of these axes is arbitrary.

Line 33 is a reference line for use in comparing the change in position of the flap 20 as it is moved from or to its stowed position to or from its take-off or landing positions.

As the drive link 10 rotates in a counterclockwise direction, it moves the flap carriage link 16 aft. Simultaneously, the drive link 10 moves the slave link 30 aft, as part of the second four-bar linkage. The moving anchor point, formed by a pivot joint 31 between the slave link 30 and the support link 26, permits the relatively short swing link 22 to move the flap carriage rear support a much greater distance aft, through a shallow arc, for maximum Fowler motion. The shallow arc is necessary for flap transition control to take-off position. The compound motion of the support link/swing link combination, not only provides the desired shallow arc for the flap carriage rear support, but it also creates an abrupt hook motion (indicated by line 35 in FIG. 1) near the end of the travel to provide ideal flap position for landing. The shallow arc motion of the flap carriage rear support is similar to that which could be achieved with a very long aft link in a single overhead four-bar linkage flap support scheme. A principle advantage of my folding truss mechanism is that it can achieve a desired motion, similar to other mechanisms requiring much greater stowage space.

The mechanism drive scheme shown, is a rotary actuator 32 connected to the drive link 10 through an actuator arm 34 and a push rod 36. Arm 34 is pivotally connected to rod 36 for pivotal movement about a pivot axis 38. The opposite end of rod 36 is pivotally attached to both the drive link 10 and the slave link 30, for pivotal movement about a common pivot axis 40. Other drive schemes are also possible, including direct rotary actuation of the drive link 10, linear hydraulic actuator or ball screw actuator drives.

The flap 20, as shown, is attached to the flap carriage fitting by spherical joint connected flap hanger links 42, 44 at three of the four flap support locations. One of the forward flap attachments is a single mono-ball joint for stability. The hangers 42, 44 would accommodate conical or skewed cylindrical flap motion as well as structural deflections. The hangers 42, 44 could be eliminated if spherical joints were used at several locations in a mechanism to provide limited lateral compliance and angular adjustment of certain links. The upper joint of the drive link 10 is a rigid pin joint for reacting side loads.

The flap mechanism fairing consists of a fixed forward segment 46 and a movable aft segment 48. The movable part 48 of the fairing is connected to the flap carriage fitting by a fairing slave link 50, which moves the fairing away from the flap 20 during deployment to clear the moving mechanism. This flap fairing 46, 48 is proportionally smaller than that for any other flap mechanism with similar motion.

The flap deployment sequence begins with an initial nose down motion as the drive link 10 moves the flap 20 aft. The flap 20 then begins to rotate in a nose up direction until it reaches the take-off position, with flap deflection at ten degrees (10°), as shown in FIG. 2. The Fowler motion at the take-off position is approximately 68.5% of the Fowler motion at maximum flap deflection. The maximum flap deflection is thirty-six degrees (36°), as shown in FIG. 3, at which point the Fowler motion is 56.3% of the flap chord and 15.3% of the wing chord. The flap chord is 27.3% of wing chord. The slot developed between the flap 20 and the trailing edge of the spoiler 52 is approximately 1.56% of flap chord for take-off and 1.7% for landing. Of course, these numerical values are for the specific embodiment that is illustrated in FIGS. 1-3. In other embodiments, the values most likely would be different.

The flap configuration shown in FIGS. 1-3 is based on an existing wing trailing edge geometry, and does not reflect the maximum capability of this mechanism scheme.

The flap mechanism scheme just described could also be adapted to incorporate an aft flap with an actuation mechanism similar to the main flap. This would result in a double slotted flap configuration which would have much better performance characteristics than the single slotted configuration.

Figure 4:
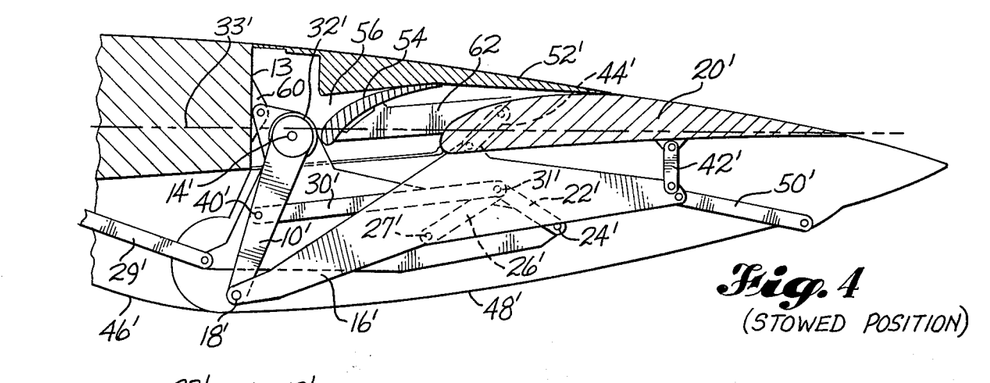
FIG. 4 is a view like FIGS. 1-3 of a fixed vane main flap and a folding truss mechanism in a stowed position.
Figure 5:
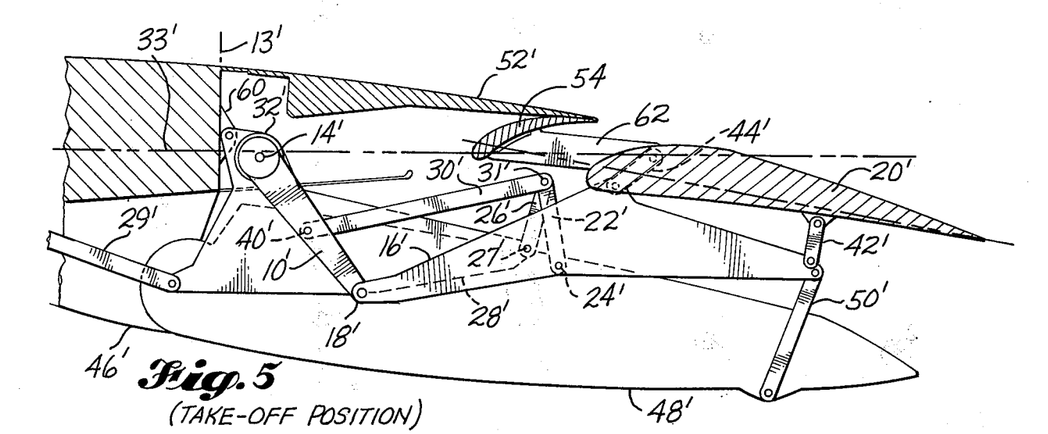
FIG. 5 is a view like FIGS. 1-4, of the mechanism shown in FIG. 4, in a take-off configuration.
Figure 6:
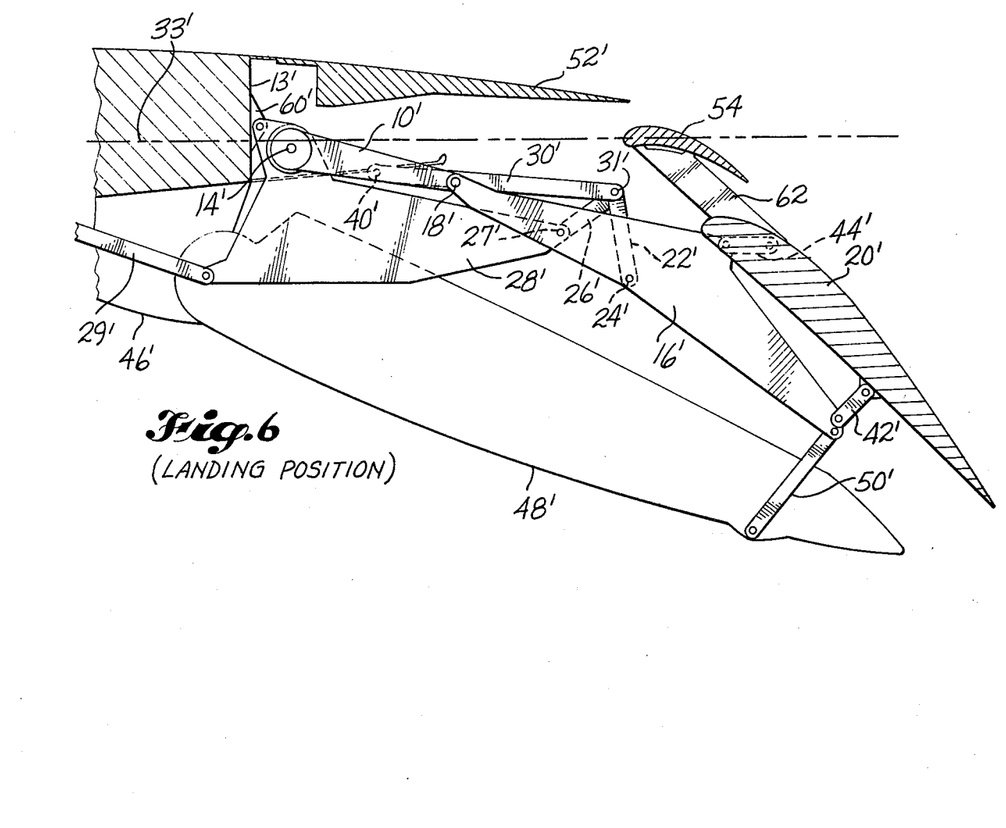
FIG. 6 is a view like FIGS. 1-5, of the mechanism shown in FIGS. 4 and 5, in a landing configuration.

Referring to FIGS. 4-6, the third embodiment involves the flap control mechanism of this invention adapted to a fixed vane/main flap. It is a modification of the single slotted flap with underneath support (FIGS. 1-3). The fixed vane/main flap configuration poses additional requirements on the flap deployment mechanism not encountered with the single slotted flap. The vane 54 must be carefully extracted from the cove 56 and in addition it must seal against the spoiler trailing edge when in the take-off position (FIG. 5). This type of motion is very difficult to accomplish with available linkage type flap mechanisms. A track type mechanism and a simple hinge are, at present, the only other ways to accomplish the required motion for a fixed vane/main flap.

In FIGS. 4-6 prime numbers have been used for the parts which correspond to the parts of the above described mechanism shown by FIGS. 1-3. In this embodiment, the support beam 28' includes an upper portion which is pivotally connected to a bracket 60 which is connected to the rear spar 13'. The upper portion of beam 28 also supports the rotary actuator 32' which, in this embodiment, is directly attached to the drive link 10'. The vane 54 is attached to flap 20' by a forwardly projecting connector strut 62.

Figure 7:
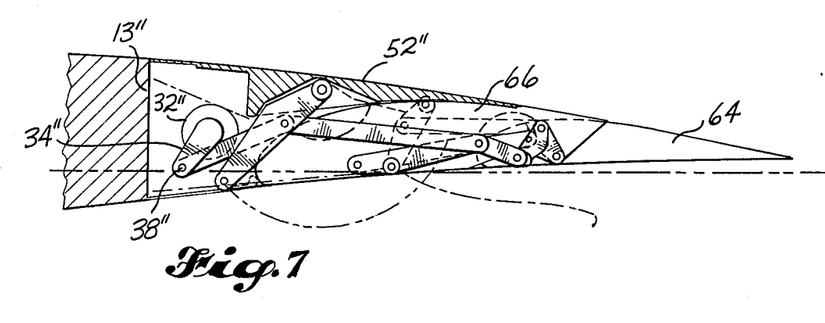
FIG. 7 is a view like FIGS. 1-6, but of a double-slotted flap and a folding truss mechanism in a stowed position.
Figure 8:
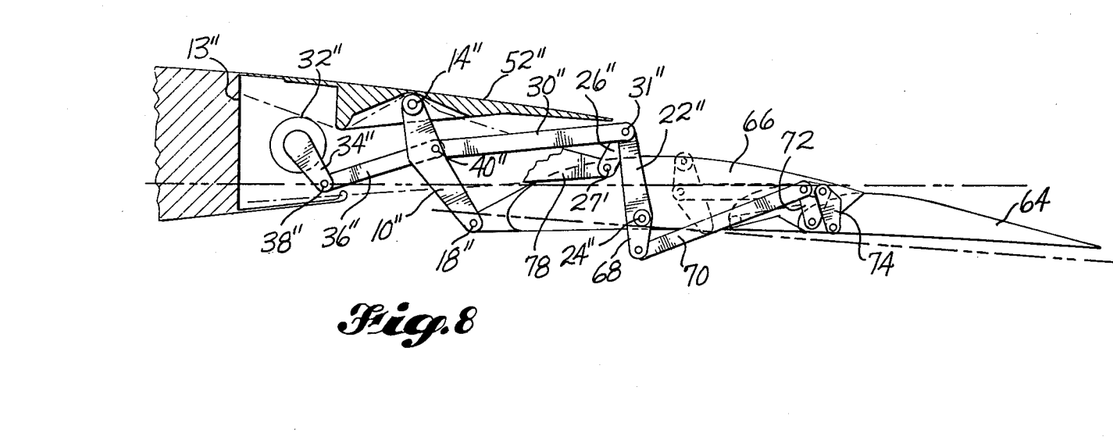
FIG. 8 is a view like FIGS. 1-7 of the mechanism shown by FIG. 7, in a take-off configuration.

FIGS. 7-9 show a double slotted embodiment. It incorporates a pair of folding truss actuation mechanisms of the type described for each flap. Each mechanism is connected to an end of its flap element. The mechanisms are enclosed entirely within the wing contour, as shown in FIG. 7.

This scheme incorporates an aft flap 64 for maximum flap effectiveness in the smallest possible package. The main flap mechanism arrangement is essentially the same as that described for the single slotted flap, with minor geometry changes. The flap carriage fitting is eliminated and the main flap 66 is attached directly to the drive link 10" and the swing link 22'. The swing link 22' has an extension 68 for actuating the aft flap 64 by means of a slave link 70. The aft flap mechanism is functionally like the main flap mechanism except that the aft support link 72 has an additional lug for supporting the aft flap support link 74. The primary difference between the main flap and aft flap linkage is that the aft flap is driven through the aft support link 72 rather than the forward support link. The aft flap also has a different relative position for take-off than the main flap, as shown in FIG. 8. There is no gap between main and aft flaps 66, 64 in the take-off position but a maximum gap 76 for landing, as shown in FIG. 9. The combined Fowler motion of main and aft flap in the take-off position is greater than that of the single slotted flap shown with underneath support.

In this embodiment, the rotary actuator 32', the first pivot joint 14", and the second pivot joint 27" are supported on a beam member 78 which is connected at its forward end to the wing rear spar 13". Even though swing link 22' includes the extension 68, the location at which it is pivotally attached to the main flap 66 may be considered to be the lower end of the swing link 22". In other words, swing link 22" is that portion of the member which interconnects pivot axes 31" and 34".

Referring to FIG. 9, the forward end of slave link 70 is pivotally attached to the lower end of extension 68 for pivotal movement about a pivot axis 80. The rear end of slave link 70 is pivotally attached to support link 72 for pivotal movement about a pivot axis 82. Link 72 is pivotally mounted onto a support portion of main flap 66 for pivotal movement about a pivot axis 84. Link 74 is pivotally attached at its lower end to the aft flap 64, for pivotal movement about an axis 86. At its opposite end it is pivotally attached to the support link 72 for pivotal movement about axis 88.

As has been shown, the folding truss mechanism of this invention is adaptable for a variety of trailing edge flap configurations. It has been shown and described in combination with single slotted flaps, main/aft double slotted flaps both with buried or underneath support schemes, and fixed vane/main double slotted flaps with underneath support. High Fowler motion for take-off position can be achieved with this type of flap mechanism (two to four times that of existing hinged flaps or track flaps). The mechanism can be designed to accommodate both scewed cylindrical or conical flap motion. All joints are simple pivots designed for minimum wear. The mechanism is designed so that aerodynamic loads on the flaps create stowing hinge moments, for a failsafe design. Hinge moments are relatively low compared with other, similar, concepts. The principle advantage of this flap support mechanism is its compact size, requiring small fairings for underneath flap support schemes and no fairings for the bearing support schemes. The payoff would be lower cruise drag for airplanes equipped with trailing edge flaps supported by a folding truss mechanism constructed in accordance with the present invention.

What is claimed is:

1. A folding truss mechanism interconnected between a wing section, and a flap, for supporting and driving the flap from the wing section, comprising:
    an upper frame portion carried by said wing section;
    a lower frame portion carried by said wing section and positioned both below and aft of said upper frame portion;
    a drive link having an upper end and a lower end;
    first pivot means pivotally connecting the upper end of the drive link to the upper frame portion of said wing section for pivotal movement about a first pivot axis;
    a support link having an upper and a lower end;
    second pivot means pivotally connecting the lower end of said support link to the lower frame portion of said wing section for pivotal movement about a second pivot axis;
    a swing link having an upper end and a lower end;
    a slave link having a forward and an aft end;
    third pivot means pivotally connecting the upper end of the swing link and the aft end of the slave link to the upper end of said support link, for pivotal movement about a third pivot axis;

fourth pivot means pivotally connecting the lower end of the drive link to a forward portion of the flap for pivotal movement about a fourth pivot axis;

fifth pivot means pivotally connecting the lower end of the swing link to an aft portion of the flap for pivotal movement about a fifth pivot axis;

sixth pivot means pivotally connecting the forward end of the slave link to an intermediate portion of the drive link for pivotal movement about a sixth pivot axis;

said drive link having a forward position and said flap being stowed when the drive link is in its forward position;

said drive link having an intermediate position and said flap being in a take-off position when the drive link is in its intermediate position;

said drive link having an aft position and said flap being in a landing position when the drive link is in its aft position; and drive means for swinging the drive link fore and aft about the first pivot axis.

2. A mechanism according to claim 1, wherein said lower frame portion is an aft portion of a support beam which is connected at its forward end to the wing structure and projects rearwardly from the wing structure.

3. A mechanism according to claim 1, wherein said flap includes a forwardly and downwardly projecting link portion having a forward end and the lower end of the drive link is connected to said flap at the forward end of said forwardly projecting link portion.

4. A mechanism according to claim 3, wherein said flap includes a rear flap link which depends downwardly and extends rearwardly from a forward portion of the flap, and the lower end of the swing link is pivotally attached to a lower portion of said rear flap link.

5. A mechanism according to claim 1, wherein said flap includes a rear flap link which depends downwardly and extends rearwardly from a forward portion of the flap, and the lower end of the swing link is pivotally attached to a lower portion of said rear flap link.

6. A mechanism according to claim 1, wherein said flap includes a main flap body and a frame portion below the body to which said drive link and said swing link are connected.

7. A mechanism according to claim 6, further comprising a front hanger link and a rear hanger link interconnected between said flap body and said frame portion.

8. A mechanism according to claim 1, comprising a movable fairing having a forward end which is pivotally attached to the fixed wing structure, said movable fairing extending from its attachment location rearwardly below said folding truss mechanism, and a link member interconnected between the flap and a rear portion of said fairing.

9. A mechanism according to claim 8, wherein said flap includes a main flap body and a frame portion below the body to which said drive link and said swing link are connected.

10. A mechanism according to claim 1, wherein the means for swinging the drive link fore and aft includes a rotary actuator spaced forwardly of the drive link which includes a depending arm, a push rod having forward and aft ends, means pivotally attaching the forward end of the push rod to a lower portion of the arm, and with the aft end of the push rod being pivotally attached by the sixth pivot means to the intermediate portion of the drive link and the forward end of the slave link, for pivotal movement about the sixth axis.

11. A mechanism according to claim 10, wherein said lower frame portion is an aft portion of a support beam which is connected at its forward end to the wing structure and projects rearwardly from the wing structure.

12. A mechanism according to claim 10, where said flap includes a forwardly and downwardly projecting link portion having a forward end and the lower end of the drive link is connected to said flap at the forward end of said forwardly projecting link portion.

13. A mechanism according to claim 12, wherein said flap includes a rear flap link which depends downwardly and extends rearwardly from a forward portion of the flap, and the lower end of the swing link is pivotally attached to a lower portion of said rear flap link.

14. A mechanism according to claim 13, wherein said flap includes a rear flap link which depends downwardly and extends rearwardly from a forward portion of the flap, and the lower end of the swing link is pivotally attached to a lower portion of said rear flap link.

15. A mechanism according to claim 10, wherein said flap includes a main flap body and a frame portion below the body to which said drive link and said swing link are connected.

16. A mechanism according to claim 1, comprising a beam member which is secured at its forward end to the wing section and projects rearwardly from the wing section, wherein said upper frame portion is an upper forward part of said beam and said lower frame portion is a lower after part of said beam.

17. A mechanism according to claim 16, wherein the means for swinging the drive link fore and aft includes a rotary actuator spaced forwardly of the drive link, said actuator including a depending arm, a push rod having forward and aft ends, means pivotally attaching the forward end of the push rod to a lower portion of the arm, and with the aft end of the push rod being pivotally attached by the sixth pivot means to the intermediate portion of the drive link and the forward end of the slave link, for pivotal movement about the sixth axis.

18. A mechanism according to claim 1, wherein said flap has forward and aft portions and support and drive linkage means between said two portions for moving the rear flap portion relative to the front flap portion.

19. A mechanism according to claim 18, wherein said swing link has a projecting portion, projecting beyond said sixth axis, and said drive linkage for the aft flap member is pivotally attached to said projecting portion of the swing link.

20. A mechanism according to claim 1, wherein said flap includes a forward connector part and the lower end of the drive link is connected to said connector part, wherein the lower end of said swing link is connected to an intermediate lower body portion of the flap.

21. A mechanism according to claim 1, comprising a fixed vane position forwardly of said flap and a structural interconnection between said vane and said flap, and said wing section including storage space for said flap and said connecting structure when the flap is in its stowed position.

22. A mechanism according to claim 21, wherein the drive means for the drive link comprises a rotary actuator attached to the upper end of the drive link, said rotary actuator having an axis of rotation coinciding with the first pivot axis.

23. A mechanism according to claim 1, wherein the drive means for the drive link comprises a rotary actuator attached to the upper end of the drive link, said rotary actuator having an axis of rotation coinciding with the first pivot axis.

24. A mechanism according to claim 21, wherein said lower frame portion is an aft portion of a support beam which is connected at its forward end to the wing structure and projects rearwardly from the wing structure.

25. A mechanism according to claim 21, wherein said flap includes a forwardly and downwardly projecting link portion having a forward end and the lower end of the drive link is connected to said flap at the forward end of said forwardly projecting link portion.

26. A mechanism according to claim 25, wherein said flap includes a rear flap link which depends downwardly and extends rearwardly from a forward portion of the flap, and the lower end of the swing link is pivotally attached to a lower portion of said rear flap link.

27. A mechanism according to claim 26, wherein said flap includes a rear flap link which depends downwardly and extends rearwardly from a forward portion of the flap, and the lower end of the swing link is pivotally attached to a lower portion of said rear flap link.

28. A mechanism according to claim 27, wherein said flap includes a main flap body and a frame portion below the body to which said drive link and said swing link are connected.

29. A mechanism according to claim 28, further comprising a front hanger link and a rear hanger link interconnected between said flap body and said flap frame portion.

30. A mechanism according to claim 21, comprising a movable fairing having a forward end which is pivotally attached to the fixed, wing structure, said movable fairing extending from its attachment location rearwardly below said folding truss mechanism, and a link member interconnected between the flap and a rear portion of said fairing.

* * * * *